No. 631,619. Patented Aug. 22, 1899.
S. C. COLE.
MACHINE FOR CULTIVATING THE GROUND AND FORMING TOBACCO HILLS.
(Application filed May 29, 1899.)
(No Model.)
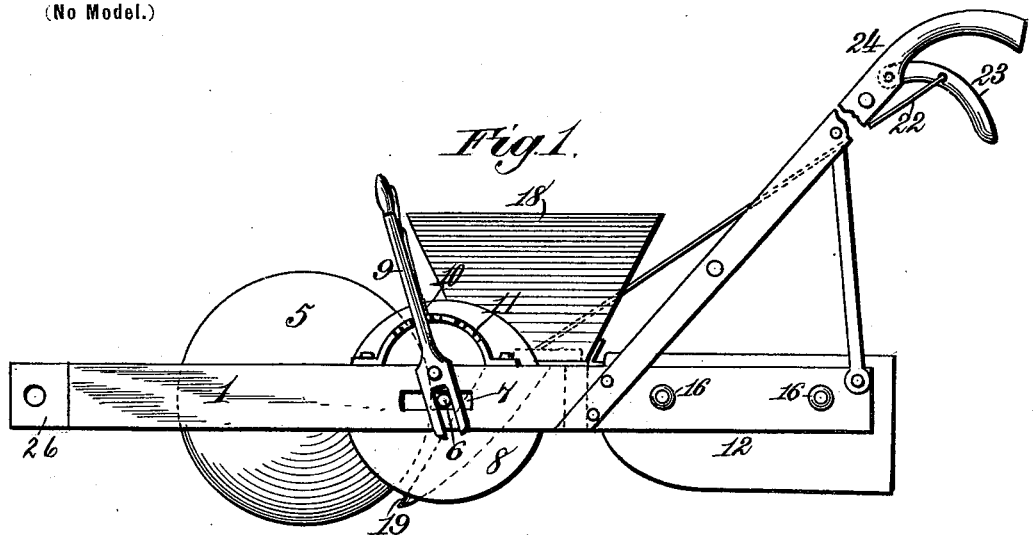
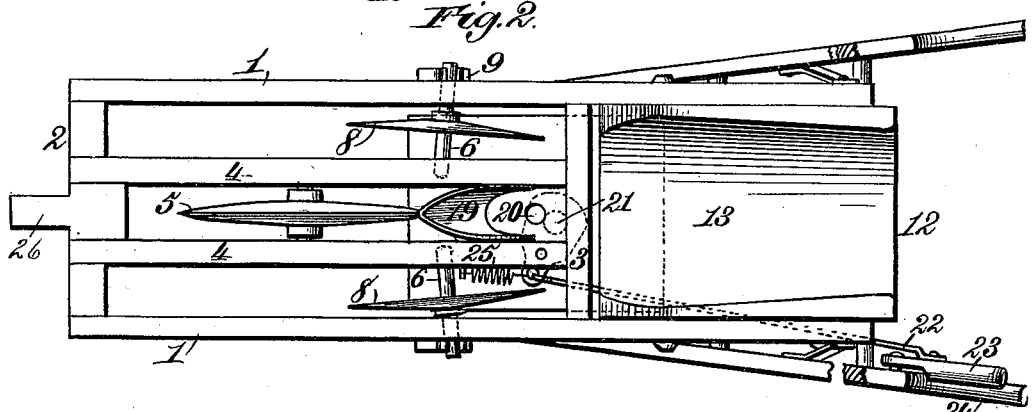
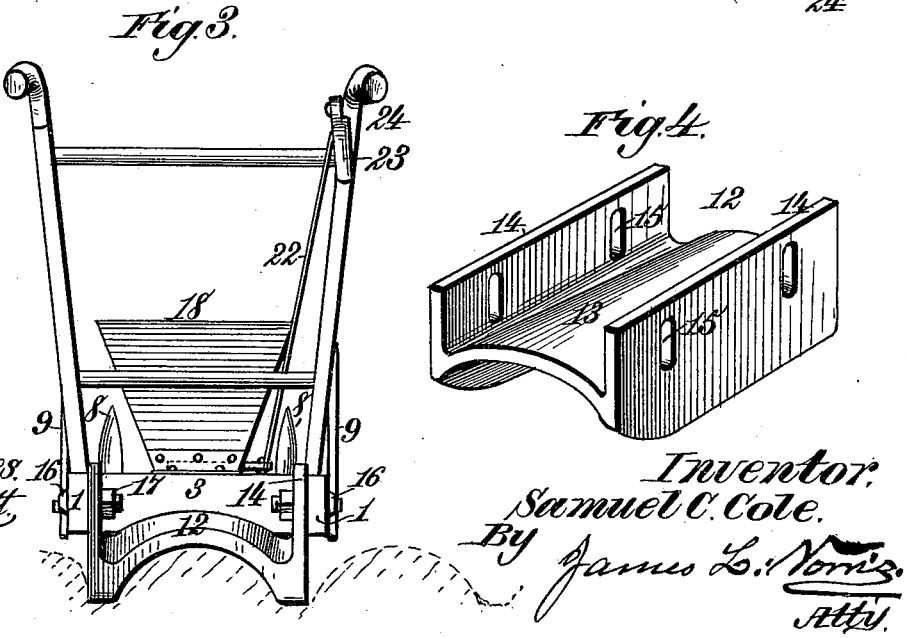
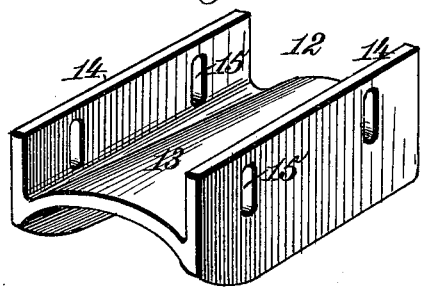
Witnesses
Inventor,
Samuel C. Cole.
By James L. Norris
Atty.

UNITED STATES PATENT OFFICE.

SAMUEL C. COLE, OF MAYFIELD, KENTUCKY, ASSIGNOR OF ONE-HALF TO WILLIAM P. ALEXANDER AND SAMUEL E. COLLEY, OF FARMINGTON, KENTUCKY.

MACHINE FOR CULTIVATING THE GROUND AND FORMING TOBACCO-HILLS.

SPECIFICATION forming part of Letters Patent No. 631,619, dated August 22, 1899.

Application filed May 29, 1899. Serial No. 718,744. (No model.)

*To all whom it may concern:*

Be it known that I, SAMUEL C. COLE, a citizen of the United States, residing at Mayfield, in the county of Graves and State of Kentucky, have invented new and useful Improvements in Machines for Cultivating the Ground and Forming Tobacco-Hills, of which the following is a specification.

This invention relates to a machine for hilling and fertilizing soil for tobacco, and has for its object to provide a simple, inexpensive, and efficient machine of the character referred to by means of which the ground may be rapidly, accurately, and thoroughly opened, broken up and pulverized and laid off in symmetrical hills or mounds, a suitable quantity of fertilizer distributed in each hill or mound, and the latter packed down or compacted.

To this end my invention consists in the features and in the construction, combination, and arrangement of parts hereinafter described, and particularly pointed out in the claims following the description, reference being had to the accompanying drawings, forming a part of this specification, wherein—

Figure 1 is a side elevation of my improved machine. Fig. 2 is a bottom plan view thereof. Fig. 3 is a rear end elevation, and Fig. 4 is a detail view, of the drag.

Preparatory to transplanting tobacco-plants it is customary to form the surface of the soil into which the plants are to be planted into hills arranged in parallel rows, the hills in each row and the rows themselves being formed equidistant apart, and it is the purpose of this invention to provide an improved machine for accomplishing this result in a thorough, rapid, economical, and efficient manner, and which I will now describe in detail.

Referring to the drawings, the numeral 1 indicates two side beams united at their forward ends by a cross-beam 2 and near their rear ends by a cross-beam 3. Secured to the forward cross-beam 2 are the forward ends of two central beams 4, the rear ends of which are secured to the rear cross-beam 3. These beams form the frame of the machine.

Journaled in fixed bearings in the beams 4 is a rotary disk-wheel 5, that operates to open or cut a narrow furrow in the soil in the center of the line of draft of the machine for the purpose hereinafter described. Loosely journaled in bearings in the beams 4 in rear of the furrow disk-wheel are the inner ends of two shafts 6, the outer ends of which have bearing in slot 7, formed in the side beams 1. On each of the shafts 6 is rigidly mounted a disk 8, slightly concavo-convex and resembling in all respects the ordinary and well-known harrow-disk, and, as shown, the concave sides of said disks are opposed to one another. The outer ends of the shafts 6 project beyond the outer sides of the side beams 1 and are each engaged by the lower forked end of a hand-lever 9, which is pivoted intermediate its ends to the side beam and is provided with a hand spring-dog 10, of ordinary and well-known construction, which is adapted to engage a ratchet-segment 11, fixed to the upper edge of the side beam. The purpose of the disks 6 is to open and break up the soil after the manner of a disk harrow on each side of the fertilizer-furrow, and by throwing the hand-levers 9 forward or backward it will be obvious the shafts 6 will be adjusted to cause the disks to assume any desired angle relative to the line of depth and throw the soil toward or from the fertilizer-furrow.

Between the rear ends of the side beams 1 is adjustably secured a drag 12, comprising a central arched portion 13, provided upon its opposite sides with upwardly-extending edges or flanges 14. The edges or flanges 14 fit snugly between the side beams and are each provided with two vertical slots 15, through which and the side beams pass headed bolts 16, nuts 17 being screwed over the inner ends of said bolts. By loosening the nuts the drag may be adjusted vertically and may also be tilted or inclined to a greater or less degree. The lower side of the drag is concaved or arched, as before stated, and this arched formation tapers from the front to the rear of the drag—that is to say, the arch gradually becomes narrower and lower from the front toward the rear—for the purpose hereinafter explained.

Fixed on the central beams 4 in front of the drag is a hopper 18, adapted to contain a quantity of fertilizer, and to the bottom of the hopper is attached a shoe 19, and in the bottom of the hopper, immediately above the shoe, is formed an aperture 20, through which the fertilizer is dropped into the shoe. An oscillating cut-off is pivoted to one side of the bottom of the hopper, and in its inner end portion is provided with an aperture 21, adapted to register with the aperture 20. To the outer end of the hopper is attached one end of a rod, wire, or other suitable connection 22, the other end of which is attached to a hand-lever 23, pivoted to one of the handles 24 of the machine. The cut-off is normally held by a spring 25 in such position that its aperture will be out of register with the aperture in the bottom of the hopper, and hence no fertilizer will be discharged from the hopper; but when the operator retracts the hand-lever the cut-off will be oscillated to cause the two apertures to register and drop a quantity of the fertilizer down the shoe. Upon the operator releasing the hand-lever the cut-off is returned by the spring to normal position. A clevis 26 of any suitable construction is attached to the front of the frame for hitching the draft-team to.

The operation of my improved machine is as follows: The machine is first driven across the field in parallel lines at uniform distances apart—say three and one-half feet—and as it traverses each one of these lines the furrow-wheel 5 first opens a narrow furrow and the two rotary disks traveling in rear of the furrow-wheel operate to open and break up or harrow the soil on each side of the furrow. The drag traveling in rear of the disks drags over the broken-up and pulverized soil and owing to the tapering arched form draws the soil toward the center and rounds it up into an elongated mound or "row," at the same time pressing and packing the soil in from the opposite sides and packing it down. At the end of this first operation the surface of the field is corrugated or formed into a series of parallel rounded rows or ridges. The machine is next driven across the field in parallel lines intersecting or crossing the previously-formed rows or ridges at right angles, the lines being the same distance apart as those first formed—viz., three and one-half feet. As the machine is driven across the rows or ridges previously formed the furrow-wheel operates to open a narrow furrow across each row or ridge and the two disks cut paths through the row or ridge on each side of the fertilizer-furrow. When the shoe enters the row or ridge, the operator retracts the hand-lever, thus dropping a small quantity of fertilizer in the furrow, after which the drag is drawn across the row or ridge, covering up the fertilizer and rounding up the divided or separated part of the row or ridge into a hill and at the same time pressing in or packing the hill and compacting it into a smooth and well-defined and regular mound. The soil is thus formed into a series of rounded and symmetrical hills each containing a uniform quantity of fertilizer in its center, the hills being arranged in parallel rows equidistant apart and the hills in each row being formed at the same distance apart. The soil of each hill is firmly packed and smoothed off, and each hill contains the same quantity of soil.

The drag may be adjusted in the manner described to pack the soil to a greater or less extent, as the nature of the soil may demand.

Having described my invention, what I claim is—

1. In a hilling-machine, the combination with a frame, and soil opening and breaking attachments carried thereby, of a drag attached to the rear end of the frame and comprising an arched plate the concave side of which decreases in width and height from its front to its rear, substantially as described.

2. In a hilling-machine, the combination with a frame and soil opening and breaking attachments carried thereby, of a drag carried by the rear end of the frame and comprising an arched plate, the concave side of which decreases in width and height from its front to its rear and means for adjusting the drag vertically, substantially as described.

3. In a hilling-machine, the combination with a frame and soil opening and breaking attachments carried thereby, of a drag carried by the rear end of the frame and comprising an arched plate, and means for independently adjusting the front and rear ends of the drag, substantially as described.

4. In a hilling-machine, the combination with a frame having rearwardly-extended side beams, and soil opening and breaking attachments carried thereby, of a drag disposed between the rear ends of the side beams and comprising an arched plate having upwardly-extending side flanges provided with vertical slots, and bolts passing through said slots and side beams, substantially as described.

5. In a hilling-machine, the combination with a frame, of two shafts arranged transversely in opposite sides of the frame, harrow-disks mounted on the shafts, means for laterally adjusting independently one end of each of said shafts, and an arched drag carried by the rear end of the frame, substantially as described.

6. In a hilling-machine, the combination with a frame, of two transverse shafts each loosely journaled at one end in the frame and at its other end having bearing in a slot formed in the frame, a harrow-disk mounted on the shaft, a lever pivoted intermediate its end to the frame and having a forked end engaging the free end of the shaft, means for locking the lever, and an arched drag carried by the rear end of the frame, substantially as described.

7. In a hilling-machine, the combination with a frame, of a furrow disk-wheel journaled in the forward part of the frame, a fertilizer-hopper arranged in rear of said frame and having an apertured bottom, a shoe attached to the under side of the bottom, an oscillating cut-off pivoted intermediate its ends to the bottom of the hopper and having an aperture in its inner end adapted to register with the aperture in the bottom of the hopper, a spring for normally holding said cut-off in position to close said last-named aperture, a rod or wire connected to the outer end of said cut-off, a pivoted hand-lever under the control of the operator attached to said rod or wire, and an arched drag-bar attached to the rear end of the frame, substantially as described.

In testimony whereof I have hereunto set my hand in presence of two subscribing witnesses.

SAMUEL C. $\overset{\text{his}}{\times}$ COLE.
$\phantom{SAMUEL C. }\text{mark}$ Witnesses:
 J. K. REYNOLDS,
 CLINT WINFREY.